(12) United States Patent
Reiffel

(10) Patent No.: US 6,945,460 B2
(45) Date of Patent: Sep. 20, 2005

(54) IMAGED CODED DATA SOURCE TRANSDUCER PRODUCT

(76) Inventor: Leonard Reiffel, 602 Demming Pl., Chicago, IL (US) 60614

(*) Notice: Subject to any disclaimer, the term of this patent is extended or adjusted under 35 U.S.C. 154(b) by 0 days.

(21) Appl. No.: 10/432,691

(22) PCT Filed: Dec. 10, 2001

(86) PCT No.: PCT/US01/48015
§ 371 (c)(1),
(2), (4) Date: May 27, 2003

(87) PCT Pub. No.: WO02/48947
PCT Pub. Date: Jun. 20, 2002

(65) Prior Publication Data
US 2004/0041027 A1 Mar. 4, 2004

Related U.S. Application Data

(60) Provisional application No. 60/256,086, filed on Dec. 15, 2000, and provisional application No. 60/318,962, filed on Sep. 11, 2001.

(51) Int. Cl.⁷ ................................................ G06K 7/08
(52) U.S. Cl. ...................... 235/450; 235/451; 235/454; 235/491; 235/494; 250/556
(58) Field of Search ................................. 235/450, 451, 235/454, 491, 494; 250/556, 568

(56) References Cited

U.S. PATENT DOCUMENTS

| | | | |
|---|---|---|---|
| 4,053,233 A | 10/1977 | Bien et al. | |
| 4,099,050 A | 7/1978 | Sauermann | |
| 4,228,430 A | 10/1980 | Iwamura et al. | |
| 4,439,672 A | * 3/1984 | Salaman | 235/462.01 |
| 4,603,231 A | 7/1986 | Reiffel | |
| 4,637,797 A | 1/1987 | Whitney et al. | |
| 4,650,334 A | 3/1987 | Alster et al. | |
| 4,684,349 A | 8/1987 | Ferguson et al. | |
| 4,945,914 A | 8/1990 | Allen | |
| 4,998,441 A | 3/1991 | Stuart | |
| 5,107,350 A | 4/1992 | Omori | |
| 5,111,410 A | 5/1992 | Nakayama et al. | |

(Continued)

FOREIGN PATENT DOCUMENTS

| | | |
|---|---|---|
| EP | 0 062 473 | 10/1982 |
| EP | 0 840 248 | 5/1998 |
| EP | 1 020 810 | 7/2000 |
| FR | 2 694 827 | 2/1994 |
| JP | 11-143629 | 5/1999 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |
| WO | WO 01/71397 | 9/2001 |
| WO | WO 01/84475 | 11/2001 |
| WO | WO 02/17037 | 2/2002 |
| WO | WO 02/17291 | 2/2002 |
| WO | WO 02/17293 | 2/2002 |
| WO | WO 02/48947 | 6/2002 |
| WO | WO 02/49340 | 6/2002 |
| WO | WO 02/49344 | 6/2002 |
| WO | WO 02/086807 | 10/2002 |

*Primary Examiner*—Steven S. Paik
(74) *Attorney, Agent, or Firm*—Hallihan Intellectual Property Law; Don Moyer; Will Hallihan

(57) ABSTRACT

The product comprises an imager (21), a coded data source (11), and a variable property having a first use, with light emanating from the coded data source (11) representing the first use and specifying which portion of light detected (12) by the imager (21) represents the variable property, where the coded data source (11) can be from a plurality of coded data sources and the imager (11) can be from a plurality of imagers (21).

26 Claims, 1 Drawing Sheet

U.S. PATENT DOCUMENTS

| | | |
|---|---|---|
| 5,181,015 A | 1/1993 | Marshall et al. |
| 5,206,556 A | 4/1993 | Hayakawa |
| 5,214,414 A | 5/1993 | Levine et al. |
| 5,282,045 A | 1/1994 | Mimura et al. |
| 5,415,553 A * | 5/1995 | Szmidla ................ 434/309 |
| 5,448,261 A | 9/1995 | Koike et al. |
| 5,453,015 A | 9/1995 | Vogel |
| 5,507,527 A * | 4/1996 | Tomioka et al. ........... 283/93 |
| 5,537,211 A | 7/1996 | Dial |
| 5,563,401 A * | 10/1996 | Lemelson ................ 235/494 |
| 5,644,126 A | 7/1997 | Ogawa |
| 5,710,416 A | 1/1998 | Belknap et al. |
| 5,712,658 A | 1/1998 | Arita et al. |
| 5,729,220 A | 3/1998 | Russell |
| 5,756,981 A | 5/1998 | Roustaei et al. |
| 5,789,732 A | 8/1998 | McMahon et al. |
| 5,795,161 A | 8/1998 | Vogel |
| 5,821,523 A | 10/1998 | Bunte et al. |
| 5,822,735 A | 10/1998 | De Lapa et al. |
| 5,825,045 A | 10/1998 | Koenck et al. |
| 5,826,578 A | 10/1998 | Curchod |
| 5,835,237 A | 11/1998 | Ebrahimi |
| 5,852,211 A | 12/1998 | Dumpelmann et al. |
| 5,852,823 A | 12/1998 | De Bonet |
| 5,867,265 A | 2/1999 | Thomas |
| 5,912,700 A | 6/1999 | Honey et al. |
| 5,917,472 A | 6/1999 | Perala |
| 5,917,486 A | 6/1999 | Rylander |
| 5,963,145 A | 10/1999 | Escobosa |
| 5,982,352 A | 11/1999 | Pryor |
| 5,988,505 A | 11/1999 | Shellhammer |
| 6,000,612 A | 12/1999 | Xu |
| 6,047,893 A | 4/2000 | Saporetti |
| 6,048,117 A | 4/2000 | Banton |
| 6,056,199 A | 5/2000 | Wiklof et al. |
| 6,082,619 A | 7/2000 | Ma et al. |
| 6,118,848 A | 9/2000 | Reiffel |
| 6,121,953 A | 9/2000 | Walker |
| 6,155,489 A | 12/2000 | Collins, Jr. et al. |
| 6,163,946 A | 12/2000 | Pryor |
| 6,167,607 B1 | 1/2001 | Pryor |
| 6,301,763 B1 | 10/2001 | Pryor |
| 6,311,214 B1 | 10/2001 | Rhoads |
| 6,314,631 B1 | 11/2001 | Pryor |
| 6,317,188 B1 | 11/2001 | Shibahara |
| 6,317,953 B1 | 11/2001 | Pryor |
| 6,330,973 B1 | 12/2001 | Bridgelall et al. |
| 6,335,685 B1 | 1/2002 | Schrott et al. |
| 6,542,083 B1 | 4/2003 | Richley et al. |
| 6,545,670 B1 | 4/2003 | Pryor |
| 6,708,885 B2 | 3/2004 | Reiffel |
| 6,720,949 B1 | 4/2004 | Pryor |
| 6,750,848 B1 | 6/2004 | Pryor |
| 6,766,036 B1 | 7/2004 | Pryor |
| 2002/0036617 A1 | 3/2002 | Pryor |
| 2002/0183961 A1 | 12/2002 | French et al. |
| 2003/0222145 A1 | 12/2003 | Reiffel |
| 2004/0027455 A1 | 2/2004 | Reiffel |
| 2004/0041027 A1 | 3/2004 | Reiffel |
| 2004/0125224 A1 | 7/2004 | Reiffel |
| 2004/0135766 A1 | 7/2004 | Reiffel |
| 2004/0188525 A1 | 9/2004 | Reiffel |
| 2004/0195327 A1 | 10/2004 | Reiffel |

* cited by examiner

FIG. 1
FIG. 2
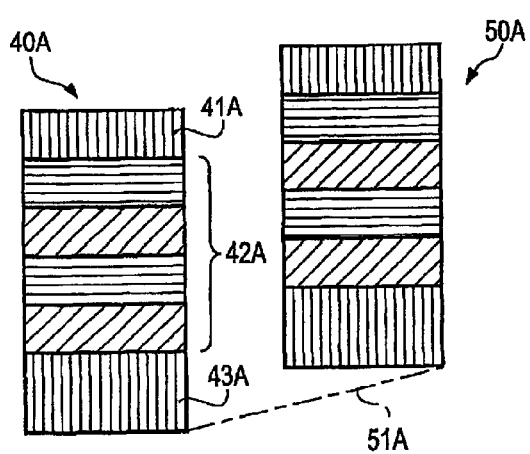
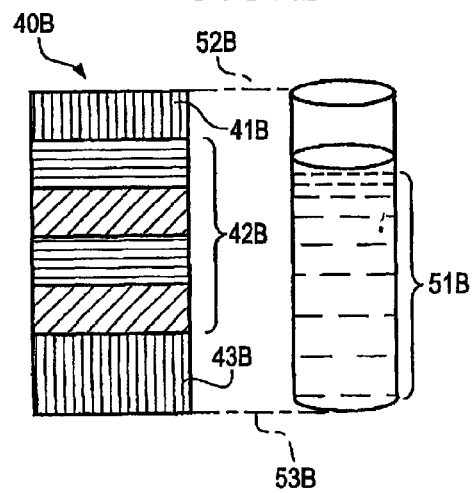
FIG. 3
FIG. 4
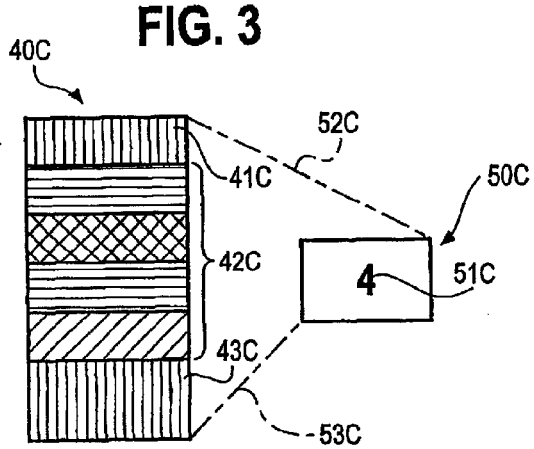
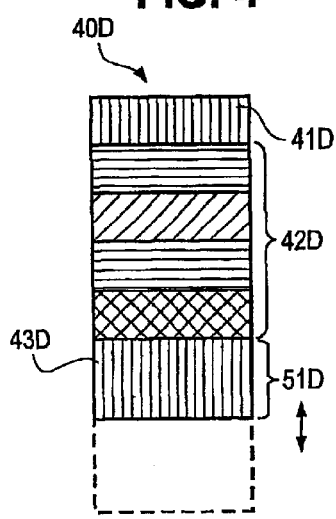
FIG. 5
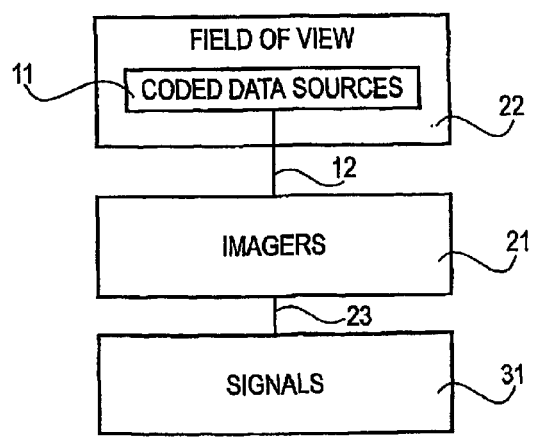

ically detect first code light and second code light,
IMAGED CODED DATA SOURCE TRANSDUCER PRODUCT This application is a national stage of PCT/US01/48015 filed Dec. 10, 2001, which claims benefit of U.S. provisional application 60/256,086 filed 15, Dec. 2000 and U.S. provisional application 60/318,962 filed 11, Sep. 2001.

The product comprises an imager, a coded data source, and a variable property having a first use, with light emanating from the coded data source representing the first use and specifying which portion of light detected by the imager represents the variable property. The coded data source can be from a plurality of coded data sources and the imager can be from a plurality of imagers.

BRIEF DESCRIPTION OF THE DRAWINGS

FIG. 1 depicts a form of the product where the variable is a position of a coded data source.

FIG. 2 depicts a form of the product where the variable property is an analog property of an object.

FIG. 3 depicts a form of the product where the variable property is a digital property of an object.

FIG. 4 depicts a form of the product where the variable property is an analog property of a coded data source.

FIG. 5 schematically depicts connections among elements of the product.

DETAILED DESCRIPTION

The transducer product comprises a first imager and a first coded data source. The first imager has a first field of view which extends along a first orthogonal axis triad.

First detected light is detected by the first imager at a first time. First code light emanating from the first coded data source is subsumed in the first detected light.

When the imager is from a plurality of imagers 21 the first field of view is subsumed in a collective field of view 22 of the plurality of imagers and the first detected light is subsumed in collective detected light 12 detected by the plurality of imagers. When the first coded data source is from a plurality of coded data sources and several coded data sources 11 from the plurality of coded data sources are in the collective field of view, code light emanating from the several coded data sources is subsumed in the collective detected light.

A first variable property has a first use which is represented by the first code light. The first variable property has a first value at the first time. The first value is represented by first value light. The first value light is a first value portion of the first detected light. The first value portion is specified by the first code light.

A first variable property can be any physical property which can have an analog or digital representation. For example the first variable property can be temperature represented by an expanding volume thermometer. A first use can be any application using the physical property. For example the first use can be temperature control.

A first signal is caused by the imager when the imager detects the first light at the first time. The first signal represents the first code light and represents the first value light. When the first imager is from a plurality of imagers the first signal is subsumed in collective signals 31 output 23 by the plurality of imagers.

When the first coded data source is from a plurality of coded data sources, second code light can emanate from a second coded data source from the plurality of coded data sources. When first code light and second code light are subsumed in the first detected light, the first imager can concurrently detect first code light and second code light, and the first signal can represent both the first code light and the second code light.

"Detect light" here and throughout means not only detecting the presence of light but also means detecting the specific properties of the light which encode data so that an imager can output a signal which represents the data. Concurrently detecting light from several data sources together distinguishes the imager from a bar code reader which can not concurrently detect light from several spatially separated bar codes, within the meaning of "detect light" used here.

The imager can be the dual mode imager of patent application PCTUS/01/13742 filed 30, Apr. 2001 and published as WO 01/84475 A1 8, Nov. 2001. The coded data source depicted in the figures is a form which works well with the dual mode imager. The bands 41A, 41B, 41C, 41D and 43A, 43B, 43C, 43D retro reflect infra red light. The locate mode of the dual mode imager detects these bands. The react mode of the dual mode imager detects light from the color bands forming coded regions 42A, 42B, 42C, 42D over other light from the field of view. Bands 43A, 43B, 43C, 43D are wider than bands 41A, 41B, 41C, 41D defining a direction. Other imagers and other forms of coded data sources can be used.

A coded data source can itself vary to provide the first value and subsequent values of the first variable property. A coded data source can have an analog variation to provide the first value and subsequent values of the first variable property. For example 40B in FIG. 4 shows that the size of band 43D can provide a first value 51D and that the band can enlarge to provide subsequent values.

Any part of a coded data source can have an analog variation to represent values of a variable property. Any property which can have an analog representation can be represented this way. For example, when a first size of a portion of a coded data source can represent a first sound frequency and a second size can represent a second sound frequency the coded data source can be used as a musical instrument.

A coded data source can vary digitally to provide the first value and subsequent values of the first variable property. Any variable property which can be represented digitally can be represented this way. This can be done. for example, by changing one, and more, of the color bands in a code region such as 42A.

The digital readout box 50C containing a digital display 51C in FIG. 3 can be a part of a coded data source. A first use here—represented by the first code light—would specify that the first value light is from the digital readout box.

A first position 40A of a coded data source can provide a first value of a variable property and a subsequent position 50A can provide subsequent values. A distance moved 51A can provide a first value, and subsequent distances moved can provide subsequent values. Positions can be reckoned relative to the orthogonal axis triad of an imager. Positions can be reckoned relative to reference coded data sources.

This analog variation of a coded data source can represent any variable property which can have an analog representation. This is especially useful for motion control and for the music example described above. Only some of many examples are described below. A person can move a coded data source and an object will be caused to have analog motion.

Coded data sources can be attached onto several parts of a face of a person and various expressions will move the coded data sources relative to each other so that each expression orientation can represent a specific control signal. Various motions such as nodding can represent specific control signals. Coded data sources can be attached to various places—teeth for example—where motions and orientations can represent control commands.

Coded data sources can be incorporated in a contact lens to identify the wearer and to track the direction of looking. A person can move a coded data source on a finger in writing and drawing motions and a display will be caused to output the writing and drawings. A person can move a coded data source to control various properties of sounds. This can emulate existing musical instruments and can be used to create new musical instruments.

First code light from a first coded data source can specify a first location of a first object which emanates first value light. A first imager will detect the first value light as a first value portion of the first detected light. The first object can vary to provide the first value and subsequent values of a first variable property.

An object can have an analog variation to provide a first value and subsequent values of a variable property. Light emanating from the object comprises value light which represents a first value and subsequent values of a variable property.

An example of this is depicted in FIG. 2 where a coded data source 40B specifies the location of an object—for example by specifying displacements 52B, 53B relative to the coded data source. In this example the object is a fluid column which can represent any variable property—such as volume, temperature, and pressure—which can be represented by a variable length fluid column.

An object can vary digitally to provide a first value and subsequent values of a variable property. An example is depicted in FIG. 3 where a coded data source 40C specifies displacements 52C, 53C to a digital readout box. Light emanating from the box represents a first value 51B and subsequent values of a variable property. Any variable property which can be represented digitally can be represented this way.

The imager—dual mode and otherwise—can have components separated in space. This can enlarge the field of view. This can facilitate determining the spatial positions of coded data sources.

The imager can have several elements which selectively detect portions of a range of values of a physical property of light from a coded data source, with the several portions detected by the several imager elements being combined to detect the full range of the physical property of light without forming an image of the coded data source.

Light from a coded data source can have various sources such as light reflected from ambient sources, a light source which is part of a coded data source, light emitted after energizing by suitable radiation, light emitted after energizing by suitable radiation with a characteristic decay time, a light source adjacent to the imager illuminating the coded data source, and combinations of these.

Light is not limited to visible light. For example, infrared can be used, and millimeter and longer wavelengths can be used. Light can be radiating energy from any portion of the electromagnetic spectrum which can provide the functions required here. Other forms of radiating energy—such as acoustic energy—which can provide the functions required here are included in the meaning of "light" here.

A "signal" from a first product part to a second product part and a first product part being "signal connected" with a second product part here, and throughout, mean that a first physical state of the first product part causes a second physical state of the second product part. This can occur by various direct causal means and can occur by any of various transmission means. Transmitted signals can be any of various point-to-point and broadcast forms of energy transmission such as wireless and via wires, cables, and fibers. Parts of transmitted signals can reside with one form of the transmitted signal, parts can reside with a second form of transmitted signal, and parts can reside with various combinations of transmitted signals.

The several causes here can act via any of various processing modes. The processing can utilize configured processing elements such as fixed circuits, can utilize configurable processing elements such as field programmable gate arrays and neural networks, can utilize instructions in a data-bearing medium, and can utilize combinations of these. The processing be stand alone, can act via a local information system, can act via a networked information system, and can act via combinations of these. The processing—in part at least—can be part of an imager.

What is claimed is:

1. A transducer product comprising:

a first imager, the first imager having a first field of view, the first field of view extending along a first orthogonal axis triad;

first detected light, the first detected light being detected by the first imager at a first time;

a first coded data source, first code light, the first code light emanating from the first coded data source, the first code light being subsumed in the first detected light;

a first variable property, the first variable properly having a first use, the first use being represented by the first code light, the first variable property having a first value at the first time, the first value being represented by first value light, the first value light being a first value portion of the first detect light, the first value portion being specified by the first code light; and a first signal, the first signal being caused by the first imager when the first imager detects the first light at the first time, the first signal representing the first code light, and the first signal representing the first value light.

2. The product of claim 1 wherein the first coded data source varies to provide the first value.

3. The product of claim 2 wherein the first coded data source varies analogously.

4. The product of claim 2 wherein the first coded data source varies digitally.

5. The product of claim 1 wherein the first value is a first position of the first coded data source.

6. The product of claim 1 wherein the first value portion of the first detected light emanates from a first object, the first object varying to produce the first value.

7. The product of claim 6 wherein the first object varies analogously.

8. The product of claim 6 wherein the first object varies digitally.

9. The product of claim 1 wherein the first imager is from a plurality of imagers.

10. The product of claim 1 wherein the first coded data source is from a plurality of coded data sources.

11. A transducer product comprising:

a first imager, the first imager being from a plurality of imagers, the plurality of imagers having a collective field of view, the first imager having a first field of view, the first field of view extending along a first orthogonal axis triad;

the first field of view being subsumed in the collective field of view;

first detected light, the first detected light being detected by the first imager at a first time;

a first coded data source, the first coded data source being from a plurality of coded data sources, first code light, the first code light emanating from the first coded data source, the first code light being subsumed in the first detected light;

a first variable property, the first variable property having a first use, the first use being represented by the first code light, the first variable property having a first value at the first time, the first value being represented by first value light, the first value light being a first value portion of the first detect light, the first value portion being specified by the first code light; and a first signal, the first signal being caused by the first imager when the first imager detects the first light at the first time, the first signal representing the first code light, and the first signal representing the first value light.

12. The product of claim 11 wherein the first coded data source varies to provide the first value.

13. The product of claim 12 wherein the first coded data source varies digitally.

14. The product of claim 11 wherein the first value is a first position of the first coded data source.

15. The product of claim 11 wherein the first value portion of the first detected light emanates from a first object, the first object varying to produce the first value.

16. The product of claim 15 wherein the first object varies analogously.

17. The product of claim 15 wherein the first object varies digitally.

18. A transducer product comprising:

a first imager, the first imager having a first field of view, the first field of view extending along a first orthogonal axis triad;

first detected light, the first detected light being detected by the first imager at a first time;

a first coded data source, first code light, the first code light emanating from the first coded data source, the first code light being subsumed in the first detected light;

a first variable property, the first variable property being a first analogous variation of the first coded data source, the first variable property having a first use, the first use being represented by the first code light, the first variable property having a first value at the first time, the first value being represented by first value light, the first value light being a first value portion of the first detect light, the first value portion being specified by the first code light; and a first signal, the first signal being caused by the first imager when the first imager detects the first light at the first time, the first signal representing the first code light, and the first signal representing the first value light.

19. The product of claim 18 wherein:

the first imager is from a plurality of imagers, the plurality of imagers having a collective field of view, the first field of view being subsumed in the collective field of view; and the first coded data source is from a plurality of coded data sources, the first code light being subsumed in the first detected light.

20. A transducer product comprising:

a first imager, the first imager having a first field of view, the first field of view extending along a first orthogonal axis triad;

first detected light, the first detected light being detected by the first imager at a first time;

a first coded data source, first code light, the first code light emanating from the first coded data source, the first code light being subsumed in the first detected light;

a first variable property, the first variable property being a first digital variation of the first coded data source, the first variable property having a first use, the first use being represented by the first code light, the first variable property having a first value at the first time, the first value being represented by first value light, the first value light being a first value portion of the first detect light, the first value portion being specified by the first code light; and a first signal,
the first signal being caused by the first imager when the first imager detects the first light at the first time,
the first signal representing the first code light, and
the first signal representing the first value light.

21. The product of claim 20 wherein:
the first imager is from a plurality of imagers,
the plurality of imagers having a collective field of view,
the first field of view being subsumed in the collective field of view; and
the first coded data source is from a plurality of coded data sources,
the first code light being subsumed in the first detected light.

22. The product of claim 21 wherein the first coded data source varies analogously.

23. A transducer product comprising:
a first imager,
the first imager being from a plurality of imagers,
the plurality of imagers having a collective field of view,
the first imager having a first field of view,
the first field of view extending along a first orthogonal axis triad;
the first field of view being subsumed in the collective field of view;
first detected light,
the first detected light being detected by the first imager at a first time;
a first coded data source,
the first coded data source being from a plurality of coded data sources,
first code light,
the first code light emanating from the first coded data source,
the first code light being subsumed in the first detected light;
a first variable property,
the first variable property being an analogous variation of the first coded data source,
the first variable property having a first use,
the first use being represented by the first code light,
the first variable property having a first value at the first time,
the first value being represented by first value light,
the first value light being a first value portion of the first detect light,
the first value portion being specified by the first code light; and
a first signal,
the first signal being caused by the first imager when the first imager detects the first light at the first time,
the first signal representing the first code light, and
the first signal representing the first value light.

24. A transducer product comprising:
a first imager,
the first imager being from a plurality of imagers,
the plurality of imagers having a collective field of view,
the first imager having a first field of view,
the first field of view extending along a first orthogonal axis triad;
the first field of view being subsumed in the collective field of view;
first detected light,
the first detected light being detected by the first imager at a first time;
a first coded data source,
the first coded data source being from a plurality of coded data sources,
first code light,
the first code light emanating from the first coded data source,
the first code light being subsumed in the first detected light;
a first variable property,
the first variable property being a digital variation of the first coded data source,
the first variable property having a first use,
the first use being represented by the first code light,
the first variable property having a first value at the first time,
the first value being represented by first value light,
the first value light being a first value portion of the first detect light,
the first value portion being specified by the first code light; and
a first signal,
the first signal being caused by the first imager when the first imager detects the
first light at the first time,
the first signal representing the first code light, and
the first signal representing the first value light.

25. A transducer product comprising:
a first imager,
the first imager being from a plurality of imagers,
the plurality of imagers having a collective field of view,
the first imager having a first field of view,
the first field of view extending along a first orthogonal axis triad;
the first field of view being subsumed in the collective field of view;
first detected light,
the first detected light being detected by the first imager at a first time;
first coded data source,
the first coded data source being from a plurality of coded data sources,
first code light,
the first code light emanating from the first coded data source,
the first code light being subsumed in the first detected light;
a first variable property,
the first variable property being an analogous variation of a first object outside
the first coded data source,
the first variable property having a first use,
the first use being represented by the first code light,
the first variable property having a first value at the first time,
the first value being represented by first value light, the first value light being a first value portion of the first detect light, the first value portion being specified by the first code light; and a first signal, the first signal being caused by the first imager when the first imager detects the first light at the first time, the first signal representing the first code light, and the first signal representing the first value light.

26. A transducer product comprising:

a first imager, the first imager being from a plurality of imagers, the plurality of imagers having a collective Geld of view, the first imager having a first field of view, the first field of view extending along a first orthogonal axis triad;

the first field of view being subsumed in the collective field of view;

first detected light, the first detected light being detected by the first imager at a first time;

a first coded data source, the first coded data source being from a plurality of coded data sources, first code light, the first code light emanating from the first coded data source, the first code light being subsumed in the first detected light;

a first variable property, the first variable property being a digital variation of a first object outside of the first coded data source, the first variable property having a first use, the first use being represented by the first code light, the first variable property having a first value at the first time, the first value being represented by first value light, the first value light being a first value portion of the first detect light, the first value portion being specified by the first code light; and a first signal, the first signal being caused by the first imager when the first imager detects the first light at the first time, the first signal representing the first code light, and the first signal representing the first value light.

* * * * *